Jan. 28, 1969   J. F. THOMAS ET AL   3,424,121
THRUSTER DUCT NOZZLE

Filed Dec. 22, 1966   Sheet 1 of 3

INVENTORS
JOHN F. THOMAS
ROBERT L. RAGOT
BY
ATTYS.

INVENTORS
JOHN F. THOMAS
ROBERT L. RAGOT

BY

ATTORNEYS

INVENTORS
JOHN F. THOMAS
ROBERT L. RAGOT

BY

ATTORNEYS

United States Patent Office 3,424,121
Patented Jan. 28, 1969

3,424,121
THRUSTER DUCT NOZZLE
John F. Thomas, Baltimore, and Robert L. Ragot, Severna Park, Md., assignors to the United States of America as represented by the Secretary of the Navy
Filed Dec. 22, 1966, Ser. No. 605,517
U.S. Cl. 114—151                     9 Claims
Int. Cl. B63h 25/46, 11/02

ABSTRACT OF THE DISCLOSURE

A thruster duct nozzle for use on a naval vehicle having means to reduce the forces opposing the effect of the thruster. This means includes means to extend and retract the nozzle and means to produce counter vortices or flow at the exit of the nozzle or to provide a nozzle in a recess with or without the means to produce the counter vortices or flow.

---

The invention described herein may be manufactured and used by or for the Government of the United States of America for governmental purposes without the payment of any royalties thereon or therefor.

The invention relates to improvements in thruster duct nozzles for propulsion of naval vehicles or ships and more particularly for submarine vehicles, and for thruster ducts in naval vehicles disposed to discharge generally laterally or transversely thereof as at the bow or stern, for example, by propelling means in the thruster duct.

The invention provides means for reducing forces which act against the desired reaction thrust direction of the naval vehicle. These forces result from a flow or vortex on the hull surface of the naval vehicle in a direction opposite to the reaction force desired for maneuver. This flow or vortex is induced by the exhaust stream of the thruster. This results in reduced efficiency of the thruster, and undesirable power consumption and, in a battery driven vehicle, undesirable battery load.

The field of art to which the invention relates is that of thruster ducts in naval vehicles to discharge generally laterally or transversely of the axis of the naval vehicle for propelling it sideways or up and down, as in maneuvering the vehicle, and more particularly relates to through thruster ducts passing through the naval vehicle from one side to the other with orifices or nozzles at the hull surface at either end of the thruster duct.

Such thruster ducts are adapted to operate as thrusters in either direction through the thruster duct, as by means of suitable propeller means disposed in the thruster duct, so that the orifices or nozzles at each end of the thruster duct at the hull surfaces are each capable of serving for either influx or efflux of the water.

According to the invention, the means provided for reducing the forces acting against the desired reaction thrust direction of the naval vehicle includes a tubular nozzle member movably mounted at the end orifice of the thruster duct adjacent to the hull surface of the naval vehicle for axial movement outwardly of the thruster duct, under action of the propelling thrust of the fluid flow upon a restriction or contraction in said tubular member and against the action of a retracting spring means for the movable tubular nozzle member. This member is self-adjusting according to the rate of fluid flow to move the nozzle opening axially outwardly relative to the skin or hull surface of the vehicle. It is also designed to move inwardly of the thruster duct when the fluid flow is reduced or reversed.

A conical shaped or recessed thruster duct nozzle orifice is also provided according to the invention whereby the extensible orifice member may be brought below the skin level of the faired surface of the hull.

The invention also provides a fixed countersunk extension or orifice member, with the distance of the orifice from the skin of the vehicle hull being provided by the conical shape of the countersink in the hull. Openings are provided in the wall of the countersunk extension or orifice to generate with the countersink space a vortex which rotates in opposition to the undesirable effux-created vortex to reduce it in size and strength.

The invention also comprises the provision of openings in the wall of the thruster duct or nozzle near the end thereof through which part of the fluid passes to produce forces counteracting and reducing the undesirable forces which act against the desired reaction thrust direction of the naval vehicle.

The invention also involves the provision, at the end of the thruster duct, of a conical shaped axially movable tubular orifice member which is normally substantially flush with the hull surface and which is movable, by the fluid pressure, relative to the skin or hull surface and provides for varying the size of openings in the thruster duct and hull surface for counteracting the undesirable force.

It is an object of this invention to provide a thruster duct nozzle for naval vehicles which is of increased efficiency and is of a structure which will function to reduce forces acting against the desired reaction thrust direction of the naval vehicle.

Another object of the invention is to provide a novel thruster duct nozzle which will reduce power consumption and undesirable battery load in a battery driven vehicle.

A further object of the invention is the provision of a thruster duct nozzle structure which is capable of self-adjustment in accordance with the fluid flow rate to move the nozzle opening outwardly farther from the skin or hull surface of the vehicle as more pressure is generated therein by the fluid flow, or to retract when the flow in the thruster duct is reduced or reversed.

Further objects are the provision of a conically shaped or recessed thruster duct nozzle orifice, which can assist in reducing the undesired forces, and also the provision of openings in the wall of the thruster duct or nozzle near the end thereof through which a portion of the fluid passes to counteract and reduce such undesired forces.

Other objects, advantages and novel features of the invention will become apparent from the following detailed description of the invention when considered in conjunction with the accompanying drawings wherein.

Figure 1:
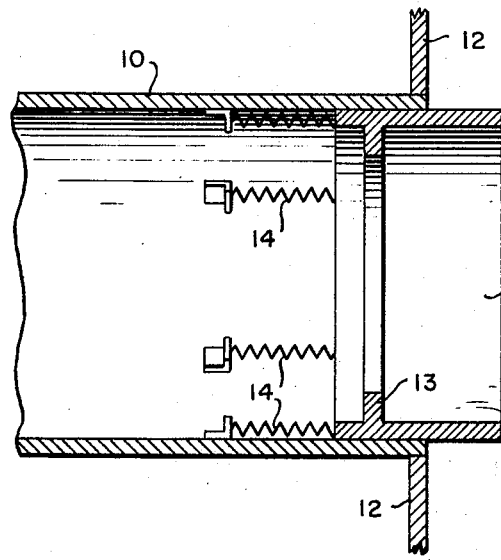
FIG. 1 is a fragmentary sectional elevation of the hull of a naval vehicle having a thruster duct and an axially movable tubular orifice member therein.
Figure 2:
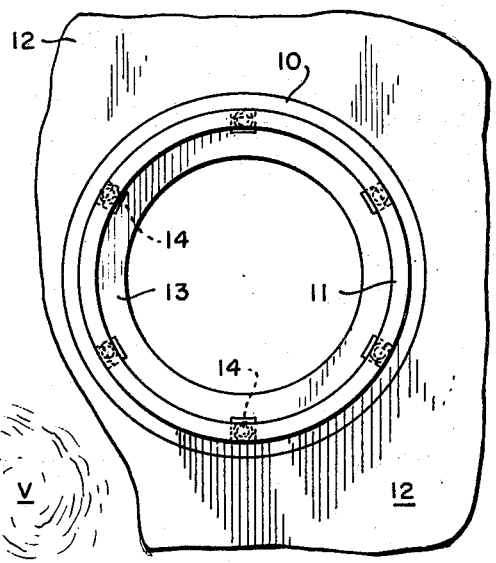
FIG. 2 is an end elevation of the structure of FIG. 1.

A thruster duct nozzle embodying this invention is illustrated in FIGS. 1 and 2, in which a thruster duct 10 is disposed generally transversely of the naval vehicle terminating in a thruster duct orifice or nozzle 11 at the outer hull surface 12 of the naval vehicle.

In this form of the invention the nozzle or orifice 11 comprises an axially movable tubular member which is telescopically received within the thruster duct 10. A contraction or restriction member or flange 13 is provided within the axially movable tubular member 11. Fluid pressure flow outwardly of the thruster duct 10 under action of suitable propeller means (not shown) bears on the contraction or restriction flange or shoulder member 13 and moves the axially movable tubular member 11 outwardly of the thruster duct 10 to extend beyond the vehicle outer hull 12. The undesirable vortex created at the hull surface by the efflux fluid flow from the thruster orifice or nozzle member 11 is thereby moved away from the hull surface as more pressure is generated across the restriction or contraction 13 and as the nozzle member 11 is moved farther outwardly by the fluid flow. The undesirable vortex is diagrammatically indicated at V.

Retractor spring means 14 are provided between the inner end of the movable tubular nozzle or orifice member 11 and the thruster duct 10, which springs 14 act against the outward movement of the member 11 under the fluid pressure and retract the member 11 within the duct 10 when the fluid flow is reduced to zero or reversed.

The axially movable tubular nozzle member 11 is thus self-adjusting according to the rate of fluid flow to move the nozzle opening or orifice outwardly relative to the skin or hull surface of the naval vehicle, and to move it inwardly of the thruster duct when the fluid flow is reduced or reversed.

Figure 3:
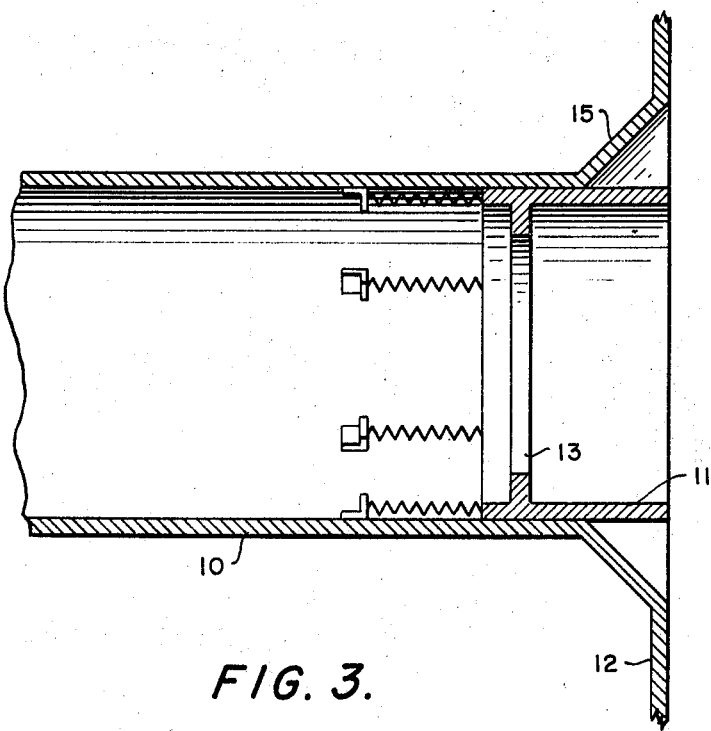
FIG. 3 is a view similar to FIG. 1 of a modification in which the opening in the hull surface is of recessed conical shape.

As indicated in FIG. 3, a modification of the device of FIG. 1 consists of providing a recessed conical shape for the orifice or opening in the hull surface as shown at 15. This makes influx through the thruster duct more efficient, where the thruster duct is of the reversible type. Also the recessed conical structure of FIG. 3 provides for the extensible tubular nozzle or orifice member 11 to be brought below or within the skin level of the hull surface and to extend and retract in the conical recess inwardly of the skin level of the hull surface. This provides advantages in some circumstances where it may be desirable to avoid extension of the nozzle or orifice member beyond the hull surface as, for example, during forward motion of the naval vehicle.

Figure 5:
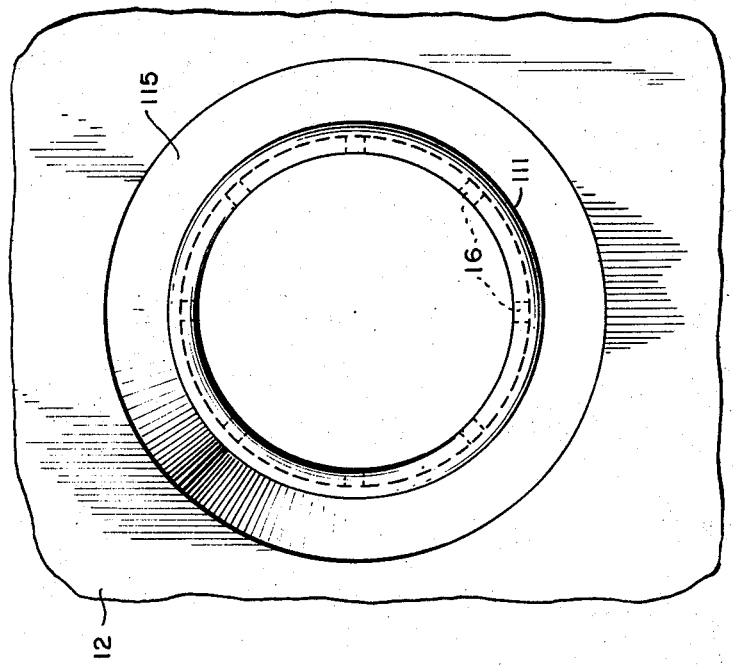
FIG. 5 is an end elevation of the structure of FIG. 4.
Figure 4:
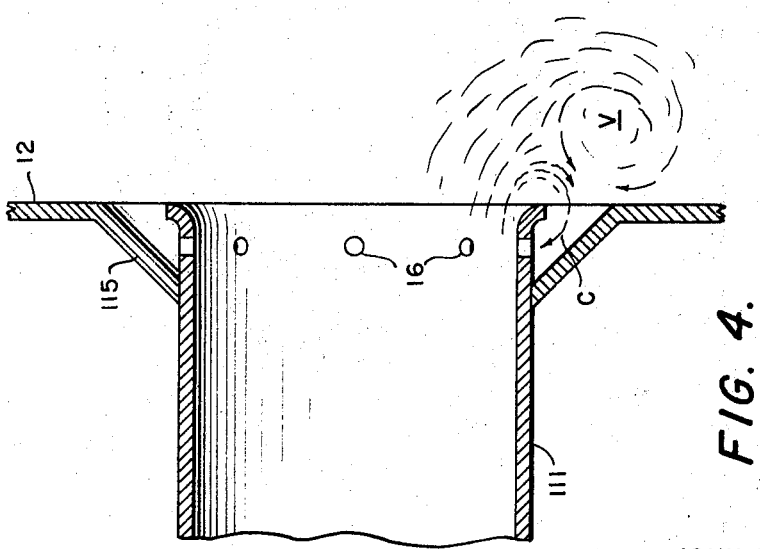
FIG. 4 is a view similar to FIG. 1 of a conically countersunk thruster extension or orifice member with openings in the wall thereof.

As indicated in FIGS. 4 and 5, the invention also provides a fixed countersunk thruster duct extension or orifice member 111 mounted to be substantially flush with the outer hull surface 12 of the naval vehicle and disposed in a conical shaped countersink structure 115 in the hull. This spaces the thruster duct orifice or nozzle 111 from the skin or surface 12 of the vehicle hull a distance provided by the conical shape of the countersink 115. The undesired fluid flow efflux-created vortex is thus removed from the skin surface of the hull by the distance so that the effect of this undesirable vortex in acting against the desired reaction thrust direction of the naval vehicle is reduced. Its effect is further reduced by this invention in the provision of openings 16 in the wall of the countersunk thruster duct extension or nozzle 111, which openings 16 generate vortexes indicated diagrammatically at C which rotate in opposition to the undersired efflux-created vortex indicated diagrammatically at V to reduce the size and strength and circulation of the vortex V and consequently to reduce velocity at the skin or surface of the hull.

It wall be apparent that, according to the invention, the provision of openings such as 16 in the wall of the thruster duct extension or nozzle member 111 to provide the counter or opposing vortexes C, or vortex spoiler streams, may be applied as well to the thruster duct extension or nozzle member 11 of the structure illustrated in FIGS. 1 and 3.

Figure 7:
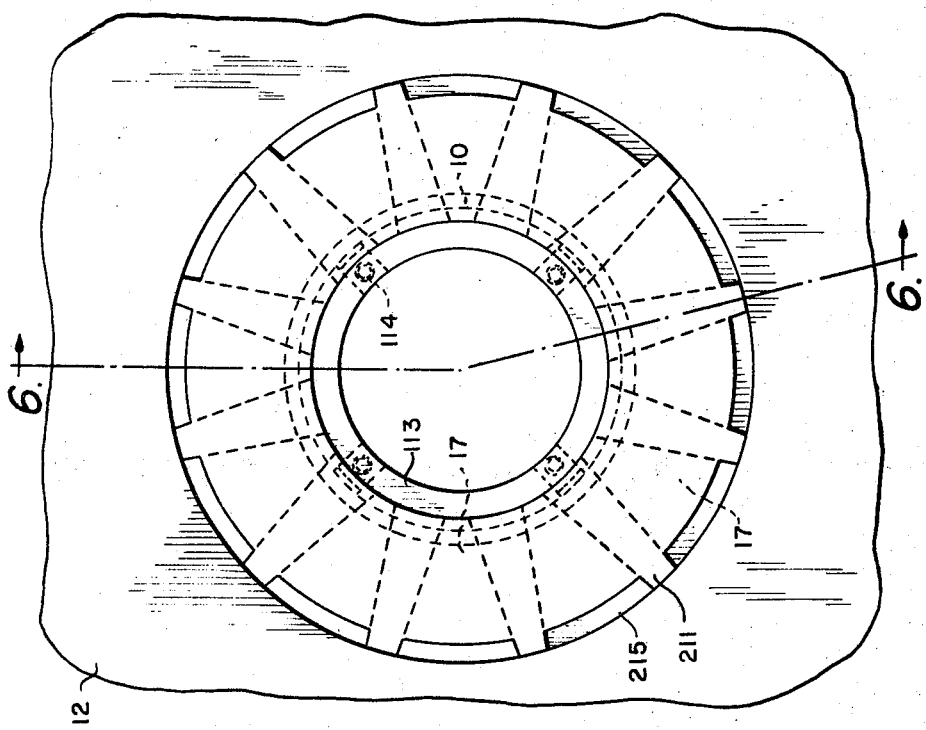
FIG. 7 is an end elevation of the structure of FIG. 6.
Figure 6:
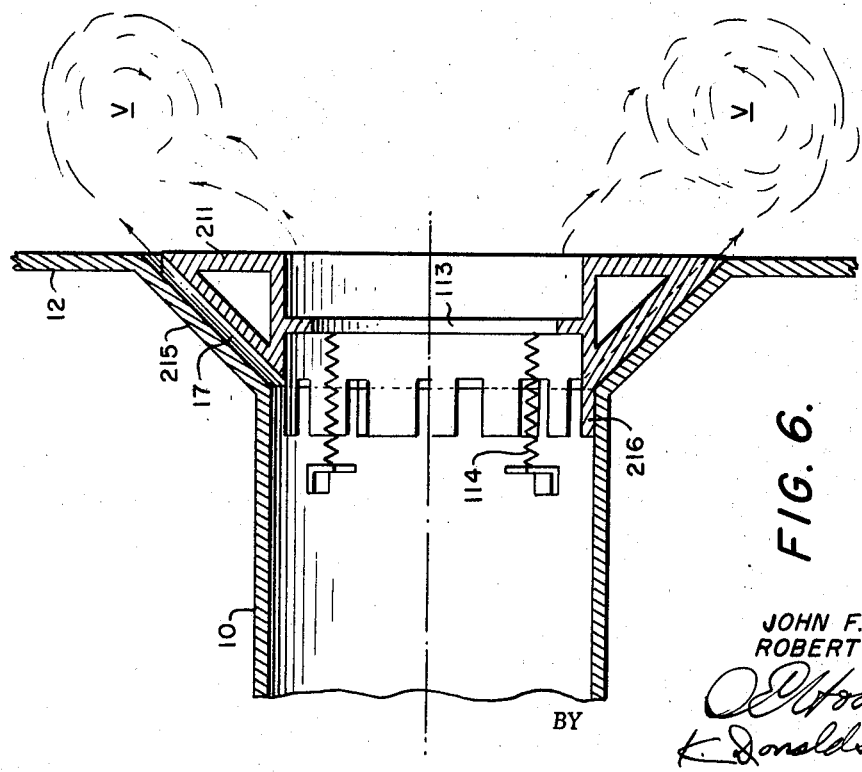
FIG. 6 is a view smiliar to FIG. 1, taken on line 6—6 of FIG. 7, of another form of the invention providing openings in the thruster duct and hull.

The invention also provides, as indicated in FIGS. 6 and 7, a normally or substantially flush mounted nozzle or orifice member 211 and provides openings or ducts 17 extending through the wall of the thruster duct 10 and through the hull surface or skin 12 at a distance from the orifice and effluent main stream. The openings 17 provide for injection of the fluid there through as a vortex spoiler stream to remove the main or undesired vortex V from the skin surface of the hull and to slow it.

Preferably, the orifice or nozzle member 211 is in the form of an axially movable member of generally conical shape at its inner portion for cooperation with a similarly generally conical shaped or recessed portion 215 of the hull, to provide the openings 17 between them. In the embodiment shown in FIGS. 6 and 7 the openings 17 are disposed in the generally conical nozzle member 211 as indicated in FIG. 6. These openings 17 extended through a slotted cylindrical extension 216 on the inner end of the conical nozzle member 211. This cylindrical extension 216 provides a guiding surface in contact with the duct 10 to hold the member 211 in alignment during operation of the thruster, as shown in FIG. 6. A constriction member or flange 113 is provided in the nozzle member 211 for moving the axially movable member 211 by the effluent fluid pressure, against the action of retracting spring means 114. This structure provides pressure adjustment by varying the size of the counter jet openings 17 according to the pressure of the fluid flow, in the nature of a pressure responsive valve structure. The openings 17 desirably flare outwardly as indicated in FIG. 7 to provide a substantially continuous vortex spoiler stream around the nozzle or orifice member 211.

In the operation of the thruster duct nozzle structure of the present invention, it will be apparent that the structure can serve with both efflux flow of fluid as well as influx flow of fluid.

In efflux flow of fluid through the nozzle structure, the means provided for removing from the hull surface and counteracting the undesired vortex, come into operation by the axially movable orifice or nozzle members of the invention, and by the conical structure and openings as described providing counter jets or vortexes for spoiling or reducing the effect of the undesired vortex.

Obviously, many modifications and variations of the present invention are possible in the light of the above teachings. It is therefore to be understood that within the scope of the appended claims the invention may be practiced otherwise than as specifically described.

What is claimed is:

1. A thruster duct nozzle apparatus for propelling a vehicle, said vehicle having at least one orifice in the outer surface thereof, said apparatus comprising:
   fluid duct means mounted in said vehicle and terminating at said orifice;
   a nozzle member at the end of the thruster duct movable axially of said duct outwardly thereof under action of the propelled fluid in said duct; and
   retracting spring means in said duct and connected to said movable nozzle member to resist the outward movement of said member and to retract it when the thrust is reduced.

2. A thruster duct nozzle apparatus as defined in claim 1, in which:
   said movable nozzle member is of tubular form; and
   a shoulder member in said movable tubular nozzle member against which the thrust of the propelled fluid acts to move it outwardly of the thruster duct.

3. A thruster duct nozzle apparatus as defined in claim 1, in which:
   the outer end of the thruster duct in which the movable nozzle member is received is of recessed conical shape surrounding said movable nozzle member.

4. A thruster duct nozzle apparatus as defined in claim 3, in which:
   said movable nozzle member is mounted to extend and retract in the said conical recess inwardly of the skin level of the hull surface.

5. A thruster duct nozzle apparatus as defined in claim 4, in which:
   said movable nozzle member when in retracted position is disposed with its outer end substantially at the inner end of the conical recess, thereby making influx therethrough more efficient when the flow in the thruster duct is reversed.

6. A thruster duct nozzle apparatus for propelling a vehicle, said vehicle having at least one orifice in the outer surface thereof, said apparatus comprising:

fluid duct means mounted in said vehicle and terminating at said orifice;

nozzle means formed at the end of said fluid duct means, and having transverse openings through the walls of said nozzle near the end thereof, said openings providing fluid passages to produce forces to counteract the forces acting against the effect of the thruster.

7. A thruster duct nozzle apparatus as defined in claim 6 wherein said nozzle means further comprises a recessed conical portion associated with the outer end portion of said nozzle means and associated with said openings therein to cooperate in producing said counteracting forces by the propelled fluid.

8. A thruster duct nozzle apparatus as defined in claim 7, in which:

the said recessed conical portion surrounds the outer end portion of said nozzle means and the openings therein.

9. A thruster duct nozzle apparatus as defined in claim 8, in which:

the end of said nozzle means comprises a conical shaped surface cooperating with said recessed conical portion of the nozzle means;

said openings being provided between said conical shaped surfaces and being of outwardly flaring shape;

said nozzle means being movable by the fluid flow axially outwardly of the thruster duct and thereby varying the size of said openings; and said conical shaped nozzle means having a slotted cylindrical extension on its inner end through which said openings extend and which provides a guiding surface in contact with the duct to hold the nozzle member in alignment during operation of the thruster.

References Cited

UNITED STATES PATENTS

| | | | |
|---|---|---|---|
| 1,365,939 | 1/1921 | Mortensen | 114—151 |
| 3,121,994 | 2/1964 | Aldropp | 115—16 XR |
| 2,024,274 | 12/1935 | Campini | 115—14 |
| 3,237,585 | 3/1966 | Winter | 114—151 |

FOREIGN PATENTS

| | | |
|---|---|---|
| 53,425 | 1/1923 | Sweden. |

ANDREW H. FARRELL, *Primary Examiner.*

U.S. Cl. X.R.

115—14